Dec. 1, 1953   E. C. CLEMENT   2,661,133
COUNTING AND DISPENSING MACHINE
Filed April 30, 1951   6 Sheets-Sheet 1
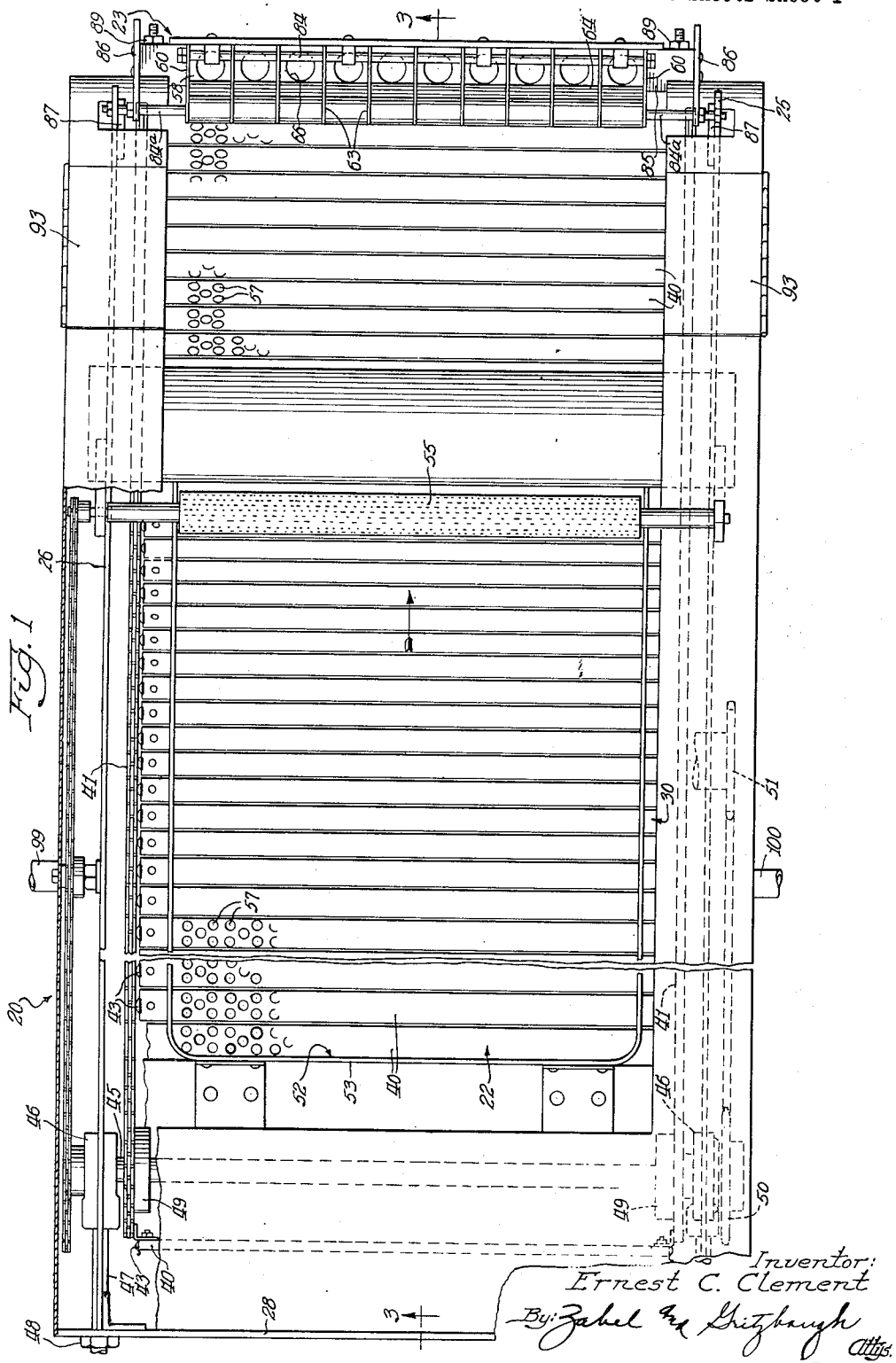
Inventor:
Ernest C. Clement
By: Zabel & Fitzbaugh
Attys.

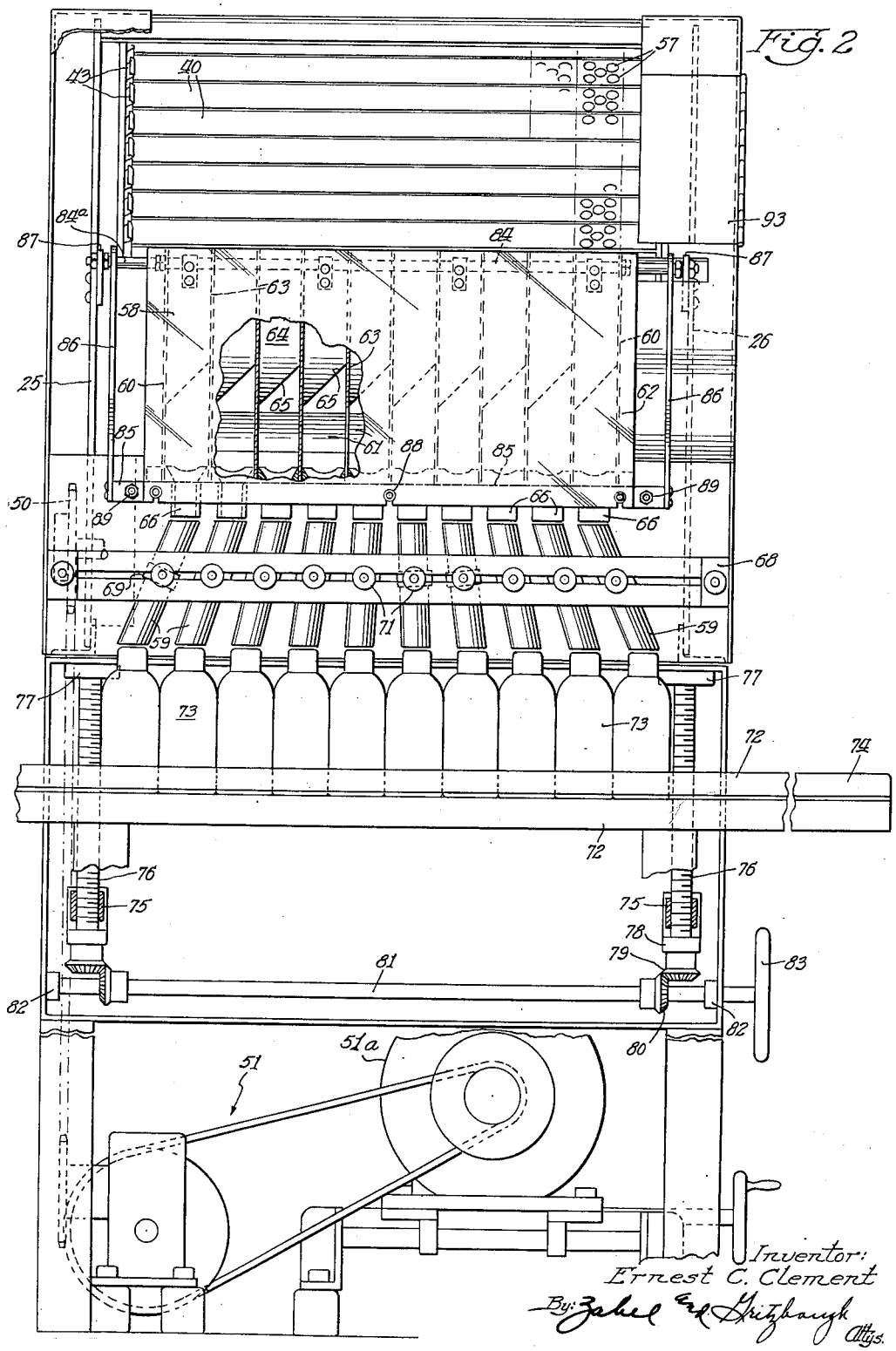

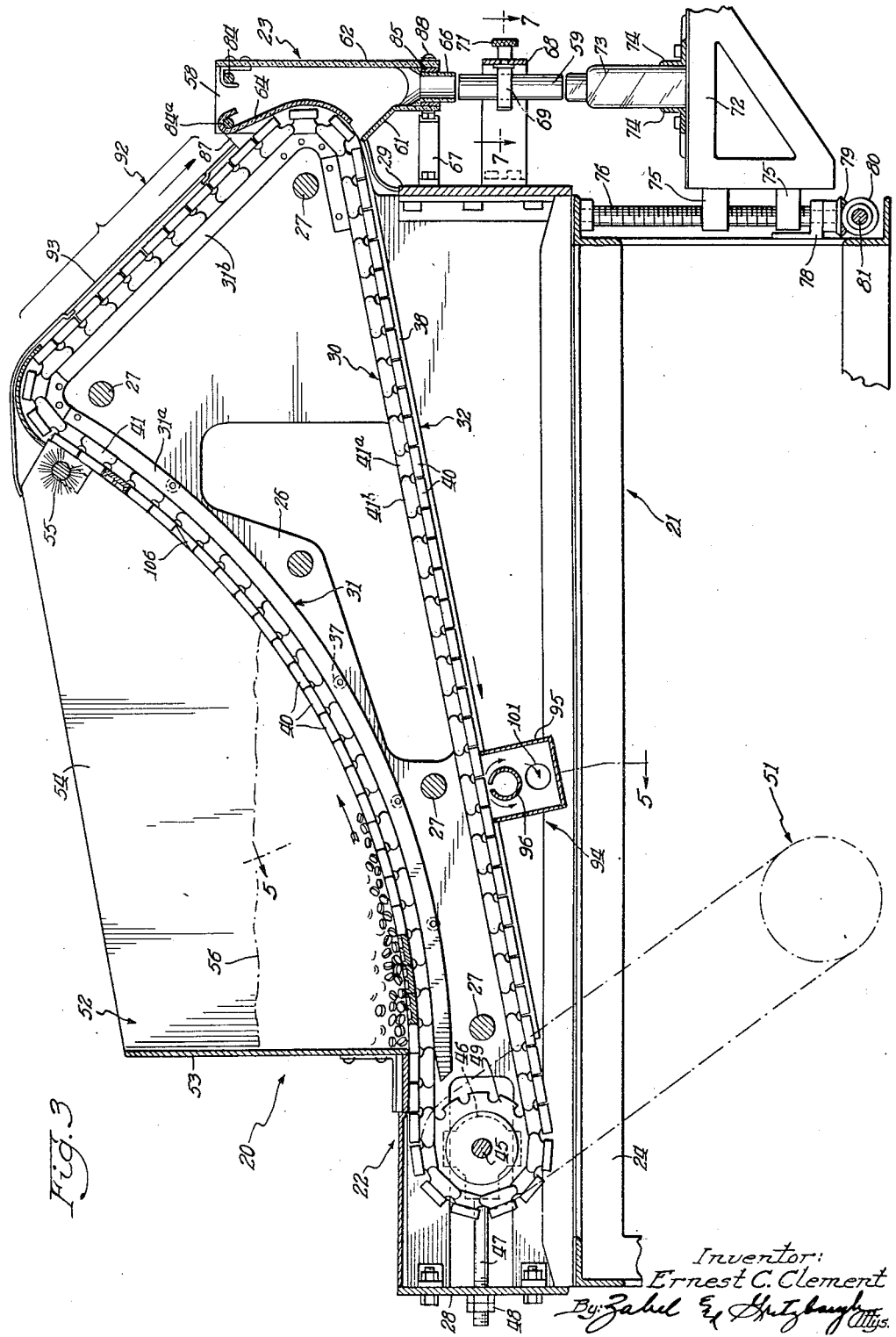

Dec. 1, 1953  E. C. CLEMENT  2,661,133
COUNTING AND DISPENSING MACHINE
Filed April 30, 1951  6 Sheets-Sheet 4
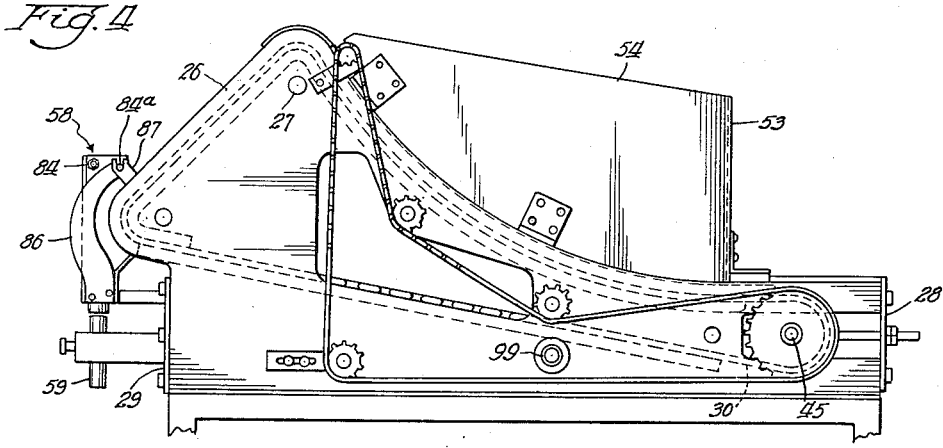
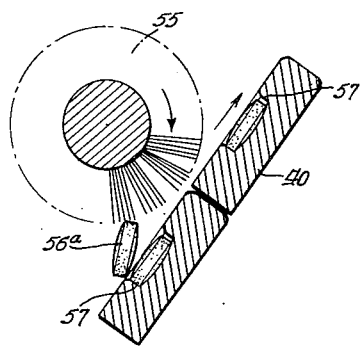
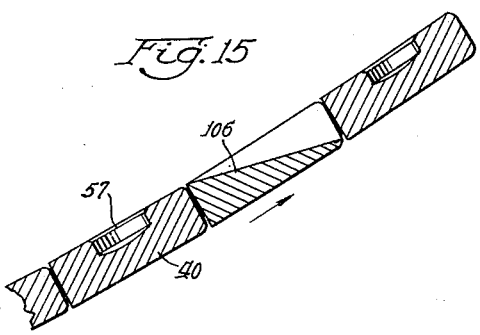
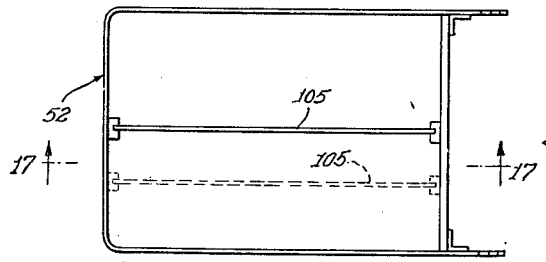
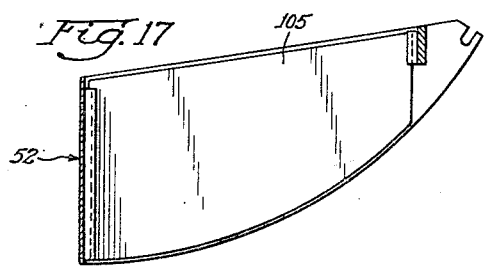
Inventor:
Ernest C. Clement Dec. 1, 1953  E. C. CLEMENT  2,661,133
COUNTING AND DISPENSING MACHINE
Filed April 30, 1951  6 Sheets-Sheet 5
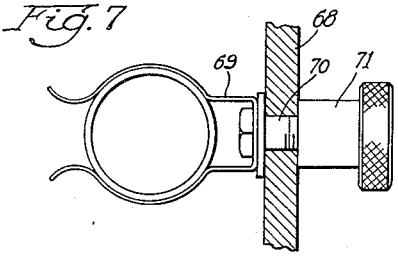
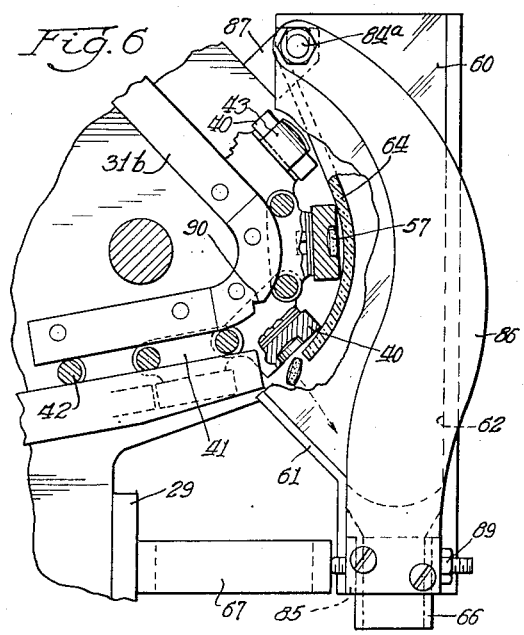
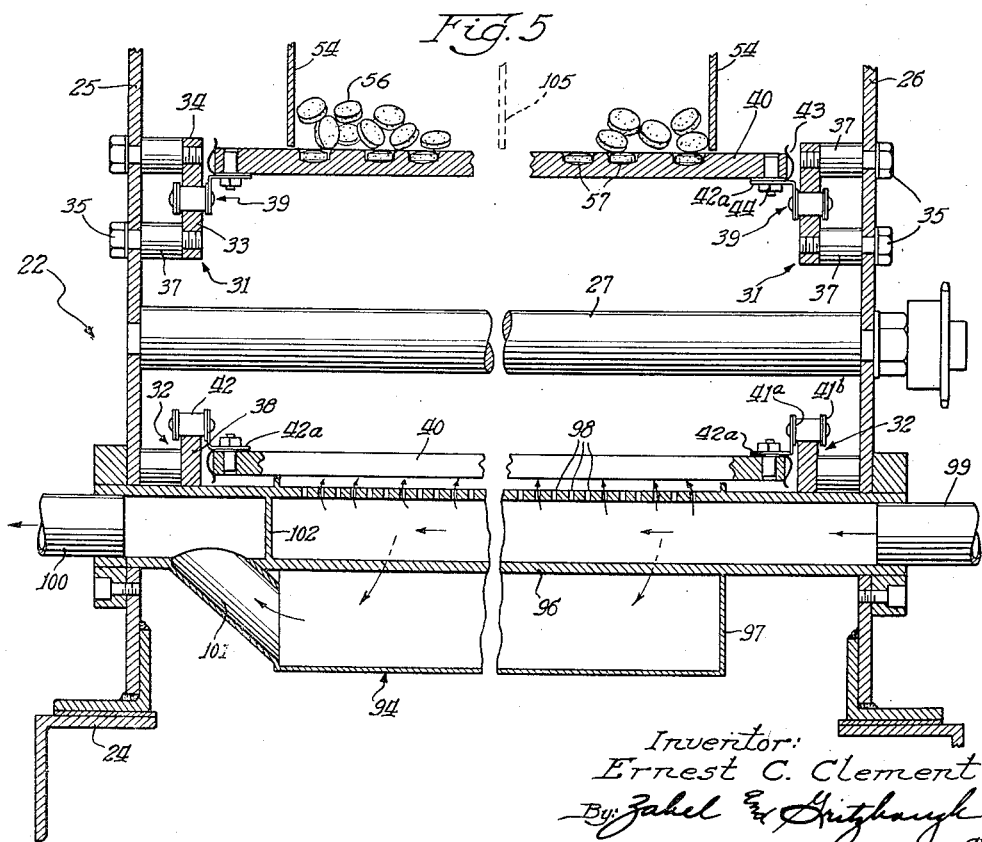
Inventor:
Ernest C. Clement
By: Zabel & Gritzbaugh
Attys

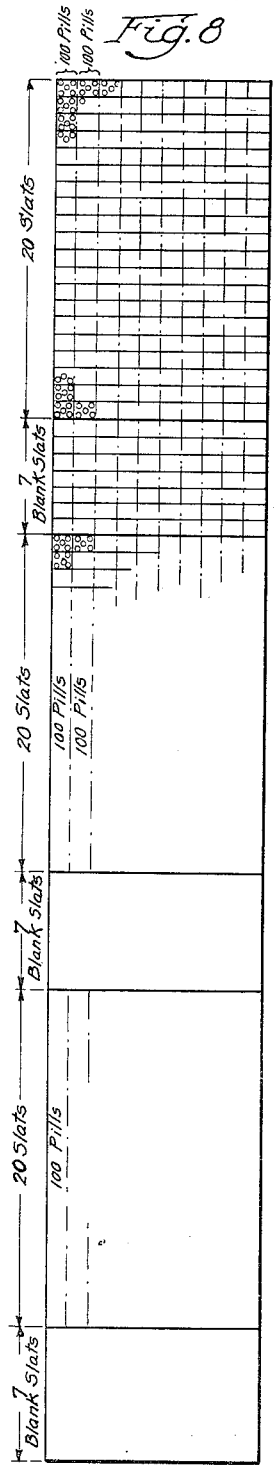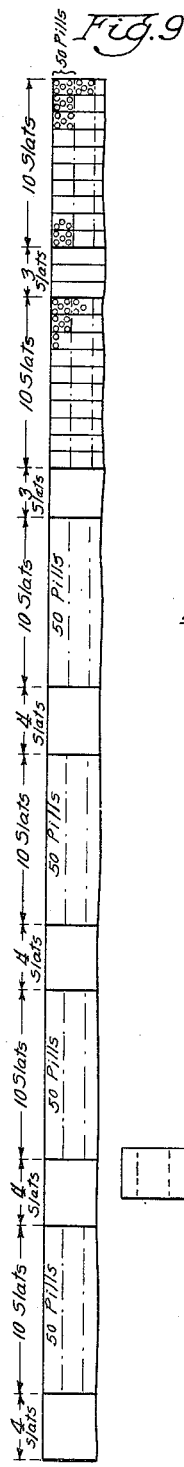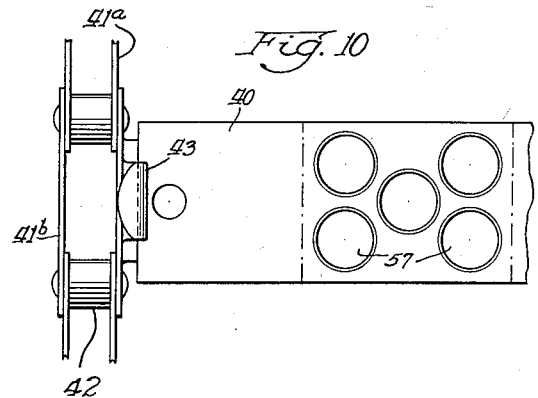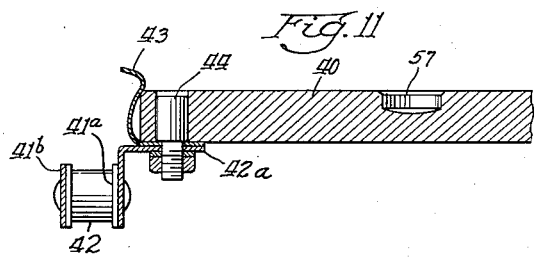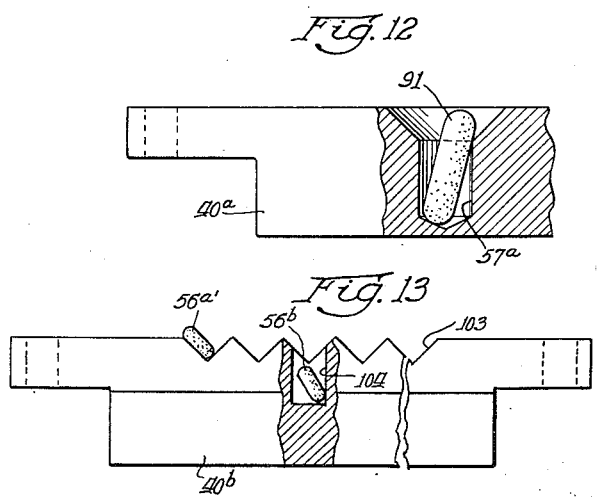

Patented Dec. 1, 1953

2,661,133

UNITED STATES PATENT OFFICE 2,661,133

COUNTING AND DISPENSING MACHINE

Ernest C. Clement, Oak Park, Ill., assignor, by mesne assignments, to United States Automatic Box Machinery Company, Inc., Boston, Mass., a corporation Application April 30, 1951, Serial No. 223,800

6 Claims. (Cl. 226—2)

The present invention relates to a pill or tablet counting and dispensing machine used to fill bottles or other containers with a predetermined number of pills or tablets.

A device embodying the present invention is relatively simple and yet efficient. Experience has shown that pills, tablets, either coated or uncoated, and even capsules are all handled readily by the present machine without damage to any of them and the accuracy of count is dependable. Operation of the machine is simple and adequate means are provided to insure proper inspection at all times of the counting and dispensing operations.

All of the foregoing constitute some of the principal objects and advantages of the present invention, others of which will appear from the following description and the drawings, in which Fig. 1 is a plan view of a machine embodying the present invention;

Fig. 2 is a front elevational view of the machine shown in Fig. 1 with portions of the machine broken away and shown in section;

Fig. 3 is a longitudinal, sectional view taken through the machine, the view being taken along the line 3—3 of Fig. 1;

Fig. 4 is a side elevational view reduced in size, taken from the far side of the machine as viewed in Fig. 3 and showing the drive for the rotary brush;

Fig. 5 is an enlarged, vertical, sectional view through a portion of the machine, the view being taken along the line 5—5 of Fig. 3;

Fig. 6 is an enlarged, fragmentary, side elevational view of one end only of the machine illustrating the discharge end of the counting trays or slats;

Fig. 7 is an enlarged, horizontal, sectional view taken on the line 7—7 of Fig. 3 and showing one of the holding brackets for a dispensing tube;

Fig. 8 is a plan layout view of all of the slats or trays making up the entire slat assembly utilized in the machine and illustrating one set-up for counting a hundred pills for each bottle;

Fig. 9 is a fragmentary view corresponding to Fig. 8 but showing another set-up for the slats whereby fifty pills are counted out into each bottle;

Fig. 10 is an enlarged, detailed plan view of one end of a slat showing its attachment to an endless chain;

Fig. 11 is a vertical, longitudinal, sectional view taken through the slat assembly illustrated in Fig. 10;

Fig. 12 is a fragmentary, side elevational view of a modified slat, a portion of the slat being broken away to illustrate a pocket suitable for accommodating a long pill or capsule;

Fig. 13 is a view corresponding to Fig. 12 but illustrating another form of slat;

Fig. 14 is an enlarged, detail view of the brush and adjacent pill slats, the view illustrating the manner in which the brush removes excess pills from the slats;

Fig. 15 is an enlarged, detail view shown in section of the breaker slats that serves to break up locked or wedged groupings of pills that form in the hopper;

Fig. 16 is a top plan view, reduced in size, of the pill hopper, showing a division plate for separating the hopper into two chambers; and Fig. 17 is a longitudinal sectional view taken through the divided hopper shown in Fig. 16, the view being taken along the line 17—17 of Fig. 16.

For purposes of illustration several embodiments of the present invention are shown in the drawings and will be described. It is recognized, however, that these embodiments may be modified in many respects without departing from the intended scope of the invention.

Referring now to the drawings and particularly to Figs. 1 and 3, a machine is illustrated generally at 20 that includes essentially a base member generally indicated at 21, a counting and conveying assembly generally indicated at 22 and a dispensing assembly generally indicated at 23.

The base 21 includes a top platform or frame 24 upon which is mounted the counting and conveying assembly 22. As best shown in Figs. 3 and 5 the counting and conveying assembly 22 includes a pair of spaced upright framing members or walls 25 and 26 that are suitably fastened to the platform 24 of the base. The spaced walls 25 and 26 are held apart and rigidly reinforced by suitable spacers, and other framing members, one of which spacers is indicated at 27 in Fig. 5. End walls are illustrated at 28 and 29 in Fig. 3.

Mounted between the upright walls or framing members 25 and 26 is an endless conveyor generally indicated at 30 in Fig. 3 that is supported on and is guided by upper and lower pairs of guide members generally indicated at 31 and 32 respectively. Each of the upper guide members 31 comprises a lower and upper guide rail 33 and 34 respectively (Fig. 5), that are rigidly fixed by means of suitable screws or bolts 35 to the upright frame or wall 25 or 26 as the case may be. Spacers 37 are disposed between the guide rails and the adjacent wall. Each of the lower guide members 32 comprises a single guide rail 38 (Fig. 5) that in turn is likewise properly spaced from the adjacent wall 25 or 26 and is secured thereto.

The endless conveyor 30 comprises spaced apart link chain assemblies generally indicated at 39 in Fig. 5, between which are supported a plurality of pill trays or slats 40. Each of the chain assemblies 39 is made up of a plurality of pairs of chain link assemblies shown at 41 in Figs. 3 and 6, each pair comprising an inner link 41a and an outer link 41b (see Fig. 5). Between the pairs of links 41a and 41b are rollers 42 mounted to rotate between the chain links 41a and 41b. As best shown in Fig. 5 the link assemblies 41 straddle the guide rails 33, 34 and 38. Mounted on each of these link assemblies 41 and projecting inwardly is an angle bracket 42a to which is attached a spring retained clip 43 (see Fig. 5). Each angle bracket 42a is apertured to receive an upstanding stud 44 upon which is mounted one of the pill carrying slats 40 that is correspondingly apertured to accommodate the studs 44.

Referring now to Fig. 3 it is noted that the upper guide assemblies 31 form the support and guideways for an upper course of the endless conveyor 30, whereas the lower guide assemblies 32 form the guideways and support for the lower course of the endless conveyor 30. The upper guide assembly 31 comprises an arcuate rising portion 31a and a downwardly inclined portion 31b, the latter portion 31b overlying to a certain extent at its lower end the guide assembly 32.

Mounted at the left hand end of the machine as viewed in Fig. 3 is a horizontally disposed shaft 45 that is suitably mounted for rotation in a pair of spaced apart adjustable bearing members 46 (see Figs. 1 and 3). Each of these bearing members 46 is mounted on a shaft 47 that passes through end wall 28 and is threaded at its free end to receive nuts 48. By adjustment of the nuts 48 on the ends of shaft 47 the movable bearings 46 may be moved to the right or to the left as viewed in Fig. 3 so as to properly locate the shaft 45. Mounted adjacent to the opposite ends of shaft 45 are a pair of sprocket wheels 49 about which the oppositely disposed link chain assemblies 39 are adapted to operate. Also mounted on the shaft 45 is an additional sprocket wheel 50 (see Fig. 1) that is powered from a suitable motor drive illustrated for example at 51 in Fig. 3.

Again referring to Figs. 1, 3 and 5, a hopper 52 is mounted on the machine in a suitable manner so that it is disposed directly over the upwardly rising portion of the upper course of the conveyor 30. This hopper includes a rear wall 53 and spaced side walls 54. The hopper is open at the top and at the bottom so that as the upper course of the conveyor 30 moves from left to right as viewed in Fig. 3 it forms a moving bottom wall or floor for the hopper 52. By movement of the shaft 45 in the manner previously described through the adjustment of nuts 48 the slack in the endless conveyor 30 can be taken up.

Disposed adjacent to the top of the upwardly inclined course of the endless conveyor 30 (assuming that the conveyor travels in a clockwise direction as viewed in Fig. 3) there is disposed a rotatable brush 55 that is suitably mounted to rotate about a horizontal axis directly over the conveyor 30 so that the bristles on the brush are spaced just slightly away from the upper faces of the adjacent pill carrying slats (see Fig. 14). This brush rotates in a clockwise direction as viewed in Figs. 3 and 14 and provides a sweeping action directly over the slats as the latter are moving under the brush in a direction from left to right as viewed both in Figs. 3 and 14.

When the machine is operating the hopper 52 is filled or supplied with pills, tablets, capsules or the like that heap up in the bottom of the hopper as indicated at 56 (Fig. 5). Each of the slats 40 is provided with a plurality of pockets 57, best shown in Figs. 5, 8, 10 and 14, and as these slats move along the upwardly inclined portion of the conveyor 30 as viewed in Fig. 3, a pill from the hopper 52 lodges in each of the pockets 57. Under certain circumstances pills may tend to stick together, in which case the brush 55 (see Fig. 14) serves to brush off the excess pill 56a (see Fig. 14) and allows it to fall back into the hopper 52.

On the front of the machine, which is the right hand end of the machine as viewed in Fig. 3, is disposed the pill dispensing assembly 23. This assembly comprises generally a manifold 58 (see Figs. 2 and 3) below which are arranged a plurality of directing tubes 59. The manifold 58 comprises a pair of spaced end walls 60, a rear wall 61, a front wall 62 and a plurality of dividing partitions 63. As best shown in Fig. 3, the rear wall 61 is only a partial wall above which is disposed a curved panel or baffle 64 which at its lower end is spaced from the wall 61 but is provided with an upwardly inclined lower cut-off edge indicated at 65 (see Fig. 2). The reason for inclining this wall 65 is to allow only one pill at a time to be discharged from each group of pills on the slat. In other words, referring to Fig. 2, over each of the compartments or chutes formed between dividing walls or partitions 60 and 63 there is indicated on each slat 40 a grouping of five pills. The cut-off edge 65 on the baffle 64 permits only one of these five pills to be discharged from the slat at a time, thereby eliminating the possibility of having a group of pills jam as they are dropped down toward the awaiting bottle 73.

The rear wall 61, the front wall 62 and the end walls and partitions 60 and 63 respectively, form a plurality of funnel-like compartments or chutes terminating at their lower extremities in discharge ports 66. Directly below each of the discharge ports 66 is disposed one of the directing or dispensing tubes 59, the top of each of which tubes is located closely adjacent to a discharge port 66. All of the dispensing tubes 59 are properly supported on the front upright framing member 29 of the machine by means of a suitable bracket 68. This bracket includes a plurality of resilient clamps, one of which is shown at 69 in Fig. 7, and each of these clamps supports one dispensing tube 59 and is swivelably mounted on a bolt 70 which in turn is threaded into an adjusting knob 71. As shown in Fig. 2 the dispensing tubes 59 diverge outwardly from top to bottom and this is accomplished by proper adjustment of the swivelable clamps 69 on the bracket 68.

Disposed below the dispensing tubes 59 is a table 72 (see Figs. 2 and 3) upon which are placed bottles 73 or other containers that are to be filled with the tablets, pills, etc. As illustrated a pair of angle bars 74 may be secured to the top of the table 72 to serve as guides for the bottles 73. As shown in Fig. 2 the dispensing tubes 59 are spaced apart at their lower extremity in such a manner that a bottle 73 can be located directly below each of the tubes.

Again referring to Fig. 3, the table 72 is provided with two pairs of threaded brackets 75, each of which pairs can be mounted on a vertically disposed threaded shaft 76. Each shaft 76 is held at the top in a suitable socket 77 and adjacent to its bottom is supported by an angle bracket 78 that is fastened to the base of the machine. On the bottom of each shaft 76 is a bevelled gear 79 that meshes with a second bevelled gear 80 disposed on a horizontal shaft 81. Shaft 81 is mounted on opposite ends in suitable bearings 82 (Fig. 2) and at one end is provided with an adjusting wheel 83. By rotating the wheel 83 the table 72 can be raised or lowered.

Again referring to Fig. 3, the front wall 62 of the manifold 58 is hung from the top on a rod 84. Along the bottom edge of this wall 62 is provided a framing strip 85 that at its opposite ends is secured to side frame members 86 (Figs. 2 and 6). These side frame members 86 in turn are pivotally mounted at their upper ends on a rod 84a that is located behind rod 84 and is fastened to vertical uprights 87 (Figs. 1, 2, 3, 4 and 6) of the machine frame.

The front wall 62 can be swung open at the bottom by swinging the wall 62 about the rod 84. Suitable fasteners 88 (Figs. 2 and 3) are provided to hold the front wall 62 against the bottom framing member 85. Under certain circumstances it may be desirable to swing both the front wall 62 together with the rest of the manifold 58 that includes the curved panel or baffle 64 and the side walls 60 away from the front of the machine and this can be done by swinging the entire unit about the rod 84a. An adjusting bolt 89 (Figs. 1, 2 and 6) cooperates with portion 67 of the frame to properly position the manifold.

Referring to Fig. 6, it will be noted that a V-shaped notch 90 is provided adjacent to the lower end of the downwardly inclined portion 31b of the guide mechanism for the conveyor 30. The rollers 42 pass over this V-shaped notch 90 in each of the guide members so as to jar the pill carrying slats 40 at this particular location.

In its operation the machine is intended to pick up a predetermined number of pills, tablets, capsules or the like from the hopper 52 and deposit them in the bottles 73 located on the table 72. In accomplishing this the slats 40 are moved in a clockwise direction as viewed in Fig. 3 about their guide rails. As these slats 40 move from left to right across the bottom of the hopper 52, a tablet, pill or the like is deposited in each of the pockets 57 (best shown in Fig. 5) throughout the length of each of the slats 40. These pills are carried in a clockwise direction about the conveyor 30 in Fig. 3 until they reach the position shown in Fig. 6 where the slats 40 are turned upside down. This takes place at the lower edge of the panel or baffle 64 and also just as the rollers on the conveyor pass over the notches 90. This results in a sudden jarring of each of the slats 40 so as to insure discharge of the pills from the slats.

These pills tumble into the manifold 58, in one of the compartments or chutes thereof, and then down through a corresponding dispensing tube 59 and into the awaiting bottle 73 on the table 72.

As shown in Fig. 2, each of the slats 40 is elongated, stretching across the entire width of the machine and the pockets 57 are arranged throughout the lengths of the slats. As indicated in Fig. 2, the pill pockets 57 in the slats are arranged in groups, each group being aligned with one of the chutes or compartments formed between walls 60 and 63 of the manifold 58. Thus as the slats are turned over as shown in Fig. 6, the pills pass into the particular manifold compartment that is in proper alignment with the pills. Thus as one slat is overturned on the conveyor a certain number of pills is deposited in each of the bottles 73 aligned on the table 72, shown in Fig. 2. As indicated in Fig. 2, actually five pills are deposited in each bottle 73 each time one of the slats 40 is overturned. If each bottle 73 is to contain one hundred pills, then the machine is arranged to load twenty slats in succession as shown for example, in Fig. 8, and then the next seven or so slats will be blanks, that is, to be provided with no pill pockets, and then these blanks in turn will be followed by another succession of twenty slats, etc. The purpose of the seven or so blank slats is to provide time for the operator to substitute his empty bottles 73 for the bottles just filled. As indicated in Fig. 2, ten bottles can be filled at one time, though obviously this number can be changed by varying the capacity of the machine.

It is also apparent that the number of pills to be deposited in each bottle or container can also be changed by merely providing the proper number of pill pockets in each slat and arranging the slats in the desired numerical pattern. The starting and stopping of the machine can be done in any well-known manner and as indicated in Fig. 2, a suitable motor 51a may be provided to furnish the power for the machine.

It is understood, of course, that the shape of the slats 40, as well as the pockets to be carried thereof, can be varied to accommodate the particular shape or size of the pill, tablet, or capsule that is to be dispensed by the machine. Fig. 12, for example, illustrates a relatively deep slat 40a that includes a relatively deep pocket 57a to accommodate a capsule 91. The slats can be readily removed from the machine by merely snapping them off since they are held in place by the spring clips 43 previously mentioned.

Still another form of slat is indicated at 40b in Fig. 13. In this form the upper surface of the slat is provided with V-notches 103. Each of these valleys formed by the V-notches is provided with a pill pocket 104 that is adapted to receive a pill or tablet, or the like. In this form of slat the pills slide into their proper receptacle down the inclined surface of the V-notches 103, as best indicated by the pill 56a' in Fig. 13 that ultimately assumes its position at 56b in the pocket 104.

Under certain circumstances it may be desirable to load some bottles with pills or tablets of one size or kind and other bottles simultaneously with pills of another size or kind or even perhaps capsules. This can be done by simply providing a dividing partition 105 (Figs. 5 and 16) in the hopper 52. The different pills will be disposed on opposite sides of this partition.

The pills in the hopper 52 may at times have a tendency to interlock with each other. A breaker slat 106 having a blank upper face that is sloping as shown in Figs. 3 and 15 will break up these interlocking patterns and allow the pills to deposit themselves freely in the pill pockets 57.

As shown in Fig. 3 an inspection area indicated at 92 is provided in order to permit the operator standing in front of the machine to see the filled slats moving down the front portion of the conveyor toward the points of discharge of the pills. A hinged plate 93 is provided over each conveyor chain to provide access to the slats for making changes (see Figs. 1 and 3).

Referring now to Figs. 3 and 5, a slat cleaning device generally indicated at 94 is mounted directly under the lower course of the conveyor 30.

This cleaning device includes a housing or box 95 in which is mounted a blower tube 96 and a suction chamber 97. The blower tube 96 is provided with apertures 98 in its upper wall directly adjacent the lower course of the conveyor 30 and a supply pipe 99 introduces air under pressure into the tube 96 and through the apertures 98. A suction or vacuum tube 100 is mounted on the machine and draws air from the vacuum chamber 97 through a connecting port 101. A wall 102 separates the pressure tube 96 from the vacuum tube 100.

Thus air introduced under pressure into the pressure tube 96 is forced through the apertures 98 against the faces of the slats 40 that are moving along the lower course of the conveyor 30. This blows loose powder and parts of pills or tablets off the slats 40 and this material falls into the suction chamber 97 and is drawn off through the connecting duct or port 101 by the vacuum tube 100.

I claim:

1. A pill dispensing machine of the class described comprising a plurality of transversely extending pill conveying slats having pill pockets therein, said pill pockets being formed by openings extending part way through said slats, a hopper adapted to contain a supply of pills, means moving the slats through the hopper first in a substantially horizontal path and then in an upwardly inclined arcuate path and through the supply of pills so that pills lodge in the pill pockets, and means discharging the pills from the slats including directing chutes to direct the pills to a predetermined position for depositing into a container.

2. A pill dispensing machine of the class described comprising a plurality of pill conveying slats having pill pockets therein, a breaker slat disposed among the pill conveying slats, said breaker slat having an upper surface which is inclined forwardly and downwardly with respect to the plane of the upper surfaces of the pill conveying slats, a hopper adapted to contain a supply of pills, means moving the slats through the hopper and through the supply of pills so that pills lodge in the pill pockets, and means discharging the pills from the slats including directing chutes to direct the pills to a predetermined position for depositing into a container.

3. A pill dispensing machine of the class described comprising a plurality of transversely extending pill conveying slats having pill pockets therein, said pill pockets being formed by openings extending part way through said slats, a hopper adapted to contain a supply of pills, means moving the slats through the hopper first in a substantially horizontal path and then in an upwardly inclined arcuate path and through the supply of pills so that pills lodge in the pill pockets, and then in a downwardly inclined path after they leave the hopper to a pill depositing station, said downwardly inclined path providing an inspection station, and means at the pill depositing station for discharging the pills from the slats including directing chutes to direct the pills to a predetermined position.

4. A pill dispensing machine of the class described comprising a plurality of transversely extending pill conveying slats having pill pockets therein, said pill pockets being formed by openings extending part way through said slats, a hopper adapted to contain a supply of pills, means moving the slats through the hopper in a substantially horizontal plane and then through an upwardly inclined arcuate path, the substantially horizontal portion of the path being disposed in the supply of pills so that pills may lodge in the pill pockets as the slats move through the hopper, means ultimately directing the slats in a downwardly inclined path after they leave the hopper to a pill depositing station, said downwardly inclined path providing an inspection station, and means at the pill depositing station for discharging the pills from the slats including directing chutes to direct the pills to a predetermined position.

5. In a pill counting and dispensing machine of the class described having a plurality of transversely extending pill dispensing slats each having groups of pill pockets therein and means for placing a pill in each pocket, the combination therewith of a depositing station comprising means for successively inverting said slats and a baffle adjacent said slats, said baffle having an irregularly shaped lower edge opposite each group of pill pockets which cooperates to discharge one pill at a time from each pocket group.

6. The combintion of claim 5 wherein said depositing station includes means for jarring said slats to insure discharge of the pills from said pill pockets.

ERNEST C. CLEMENT.

References Cited in the file of this patent

UNITED STATES PATENTS

| Number | Name | Date |
|---|---|---|
| 740,801 | Brough | Oct. 6, 1903 |
| 792,918 | Ohlendorf et al. | June 20, 1905 |
| 1,460,778 | Wilkie | July 3, 1923 |
| 2,094,460 | McBean et al. | Sept. 28, 1937 |